United States Patent
Burkhardt et al.

(10) Patent No.: US 6,892,763 B2
(45) Date of Patent: May 17, 2005

(54) VALVE ARRANGEMENT

(75) Inventors: Werner Burkhardt, Esslingen (DE); Jürgen Gerhartz, Esslingen (DE)

(73) Assignee: Festo AG & Co., Esslingen (DE)

( * ) Notice: Subject to any disclaimer, the term of this patent is extended or adjusted under 35 U.S.C. 154(b) by 421 days.

(21) Appl. No.: 10/089,970

(22) PCT Filed: Jul. 26, 2001

(86) PCT No.: PCT/EP01/08634
§ 371 (c)(1), (2), (4) Date: Apr. 8, 2002

(87) PCT Pub. No.: WO02/12763
PCT Pub. Date: Feb. 14, 2002

(65) Prior Publication Data
US 2002/0148520 A1 Oct. 17, 2002

(30) Foreign Application Priority Data
Aug. 10, 2000 (DE) .......................... 100 39 072

(51) Int. Cl.$^7$ .............................................. F16K 00/00
(52) U.S. Cl. ...................... 137/884; 137/269; 137/271
(58) Field of Search ................................ 137/270, 271, 137/884; 251/368

(56) References Cited

U.S. PATENT DOCUMENTS

| 3,513,876 A | * | 5/1970 | Tarbox ........................ 137/884 |
| 3,540,693 A | * | 11/1970 | Wise ........................... 251/170 |
| 3,563,265 A | * | 2/1971 | Graham ....................... 251/368 |
| 4,247,133 A |   | 1/1981 | Möller |
| 5,383,689 A |   | 1/1995 | Wolfe, Sr. |
| 5,555,911 A |   | 9/1996 | Fukano et al. |
| 6,039,358 A | * | 3/2000 | Stoll et al. .................... 285/23 |
| 6,206,028 B1 | * | 3/2001 | Holden et al. ............... 137/271 |

FOREIGN PATENT DOCUMENTS

| DE | 12 10 283 A | 3/1966 |
| EP | 0 493 972 B1 | 8/1992 |
| EP | 0 862 002 A1 | 2/1998 |

* cited by examiner

Primary Examiner—John Fox
(74) Attorney, Agent, or Firm—Hoffmann & Baron, LLP

(57) ABSTRACT

A valve arrangement, which possesses at least one valve, which is has a valve housing provided with housing ducts. On opposite sides of the valve housing there are first and a second interfaces for the fitting of a first and a second connection board. Each connection board comprises at least one connection duct communicating with a housing duct and is held on the valve housing because on the one hand it is anchored by way of retaining means on the valve housing and on the other hand is fixed by means of attachment means passing internally externally through the valve housing on the oppositely placed second connection board.

23 Claims, 2 Drawing Sheets

VALVE ARRANGEMENT

This application is the U.S. National Phase of International Application Number PCT/EP01/0008634 filed on Jul. 26, 2001, which is incorporated herein by reference.

BACKGROUND OF THE INVENTION

1. Field of the Invention

The invention relates to a valve arrangement which comprises at least one valve having a valve housing provided with ducts in it, said valve arrangement being able to be mounted on a connection board by way of an interface so that at least one duct extending in the valve housing communicates with a connection duct running in a second connection board.

2. Description of the Prior Art

Such a valve arrangement is for example described in the European patent publication 0 493 972 B1. In this known case a plurality of connection boards collected together to constitute a fluid manifold bar are present, on each of which a valve is mounted, all housing ducts extending in the valve housing opening at that interface, which was to the fore when the valve housing was mounted on the associated connection board. Attachment between a respective valve and the associated connection board is performed using hybrid retaining and locking means. For the connection of the load to be operated each connection board is provided with connection means, which render possible the attachment of fluid lines.

Although this known valve arrangement renders possible a relatively simple attachment of the valve to and detachment from the respectively associated connection board, if adaptation for different connection means for fluid lines is to take place, complete disassembly of the fluid manifold constituting the connection boards is necessary.

OBJECT AND SUMMARY OF THE INVENTION

One object of the invention is to create a valve arrangement, which while ensuring the possibility of simple mounting and detachment does provide for a adaptable arrangement to suit different applications.

This object is to be achieved by a valve arrangement having at least one valve, with a housing provided with ducts, which at a first side thereof has a first interface for the fitting of a first connection board and at a second side thereof opposite to the first housing side has a second interface for the fitting of a second connection board, each connection board having at least one connection duct, which communicates with housing duct, adjacent to the associated interface, and with such connection duct, at least in the case of the first connection board attachment means are associated for the connection of a fluid line, the first connection board being held on the valve housing by being anchored on the one hand using retaining means on the valve housing and on the other hand it is fixed on the second connection board placed on the second interface, spaced from the retaining means, by means of attachment means passing through the valve housing on the inside and/or outside.

In the case of this valve arrangement the respective valve therefore is flanked on opposite sides by a respective connection board, the connection boards being placed at suitable interfaces on the valve housing. The first connection board provided with connection means for the connection of at least one fluid duct is so held on the valve housing that on the one hand it is retained and anchored on the valve housing and on the one hand is fixed using additional attachment means. In this case the attachment means perform multiple functions because they not only serve for attachment of the first connection board, but furthermore simultaneously contribute to holding a second connection board mounted on the opposite side of the valve housing. If in the case of this second connection board is a component of a fluid manifold board, it is possible then for the attachment means to be combined on the one hand for attachment of the first connection board in relation to the valve housing and on the other hand attachment of the valve housing on the fluid manifold board. During assembly of the valve arrangement the required fluid power connection means may be selected to suit the actual application by providing the valves individually with first connection boards, which have the specifically required connection means. The result is accordingly a modular structure, which renders possible an adaptable manufacture and assembly of the valve arrangement to meet a specific application.

Advantageous developments of the invention are defined in the dependent claims.

It is convenient for the second connection board to be anchored on the valve housing in a manner similar to the first connection board using retaining means so that the jointly associated attachment means only have to be employed to fix and install the connection boards at the site of the respective interface.

It is more especially advantageous to have a design in which the attachment means are constituted by a single attachment screw, which is more especially so installed that its driven end is associated with the first connection board. The fitting and dismounting of the in the individual components may in this fashion be performed rapidly and expediently.

It is convenient to utilize a self-tapping screw as the attachment screw, when it is screwed in for the first time cut its thread in an associated attachment hole in the second connection board.

At the interfaces in the transitional area between mutually communicating ducts in the housing and the connection means it is preferred to provide seal means, which prevent the escape of fluid and in the case of which it is for instance a question of seal rings. Preferably, the seal means consist of a rubber-elastic material, such rings undergoing a deformation in the course of fitting of the connection board and being swaged in place. If in such a case the attachment screw has already bitten into the first connection board and into the valve housing while however not yet being screwed into the second connection board, the first connection board is thrust into an oblique setting in which it assumes a position in which it is slightly inclined in relation to the valve housing around the part with the retaining means and in which it is fixed by the skew attachment screw between the valve housing and the first connection board. This means that it is possible to provide a non-proof, tethering detachable connection between the first connection board and the valve housing even when the second connection board is not yet fitted, something which is an advantage in the case of the supply of replacement parts or for shipping purposes.

One or both of the interfaces may be provided on the floor of a recess in the valve housing, which at the front side is delimited by an attachment flange of the valve housing, which serves for attachment of the valve housing on a valve drive, as for example on an electromagnetic means or a piezoelectric means. In this case the components on the valve housing of the retaining means may be provided on the side of the attachment flange facing the recess.

Each connection board provided with components of the retaining means may be so designed that in the fitted state it conceals all retaining means associated with it and more especially in such a manner that the retaining means are not visible from the outside.

The valve arrangement may include only one single valve, whose housing is flanked on opposite sides by one respective, single connection board. However, it is only possible to have a design in which several valves present whose second connection boards are constituted by a common fluid manifold board or plate on which the valve housings may be mounted at their second interfaces. This means that a battery-like valve arrangement may be produced.

In the case of a particularly advantageous design the first connection board is provided with a connection duct, which constitutes a power duct able to be connected with a load to be operated. The second connection board is in this case provided with at least one supply duct and at least one venting duct as duct as a connection duct. To the extent that the first connection board does not require any connection means for fluid ducts on it, this connection board can be replaced by a dummy board which is similar in design as regards the retaining means and the other attachment means, but in the case of which there is no connection duct and no associated connection means. It is convenient in this case to provide a second connection board, which in addition to having at least one supply duct and at least one venting duct also has at least one power duct as a connection duct.

BRIEF DESCRIPTION OF THE DRAWINGS

In the following the invention will be described with reference to the accompanying drawings.

DETAILED DESCRIPTION OF THE PREFERRED EMBODIMENTS

The illustrated valve arrangement comprises a valve unit 1 and a valve drive 2, the latter being assigned to operation of a valve 3 of the valve unit 1.

The valve drive 2 in the form of an electromagnetic means, although it may have some other principle of operation and may be a piezoelectric means for instance. The operation thereof is performed using electric power, which is supplied by way of switch contact means 4.

Figure 1:
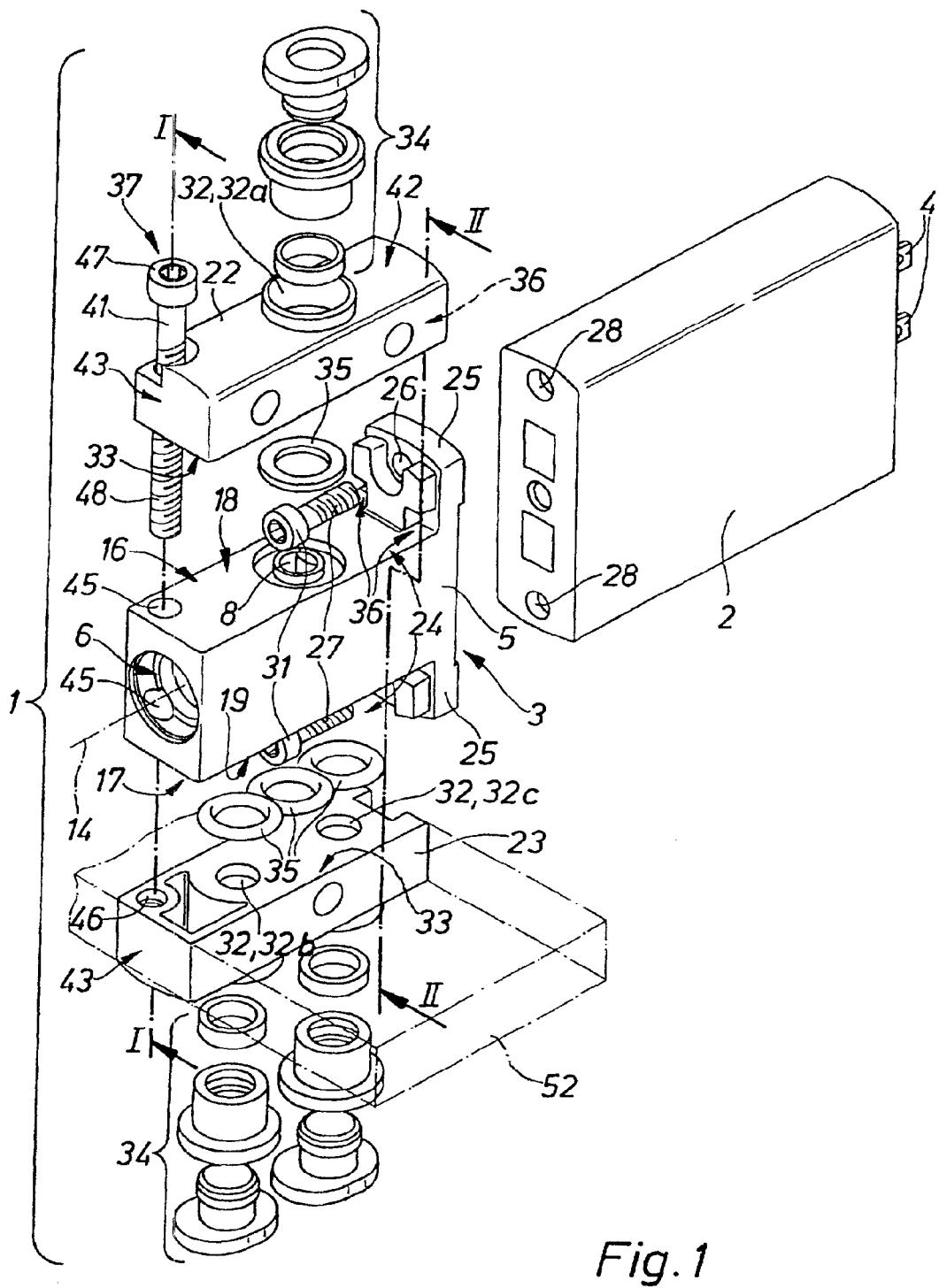
FIG. 1 shows a preferred embodiment of the valve arrangement in accordance with the invention in a perspective, exploded view.

The valve 3 possesses a valve housing 5, wherein a receiving space 6 is located, said space containing a valve member 7 not illustrated in FIG. 1.

Figure 3:
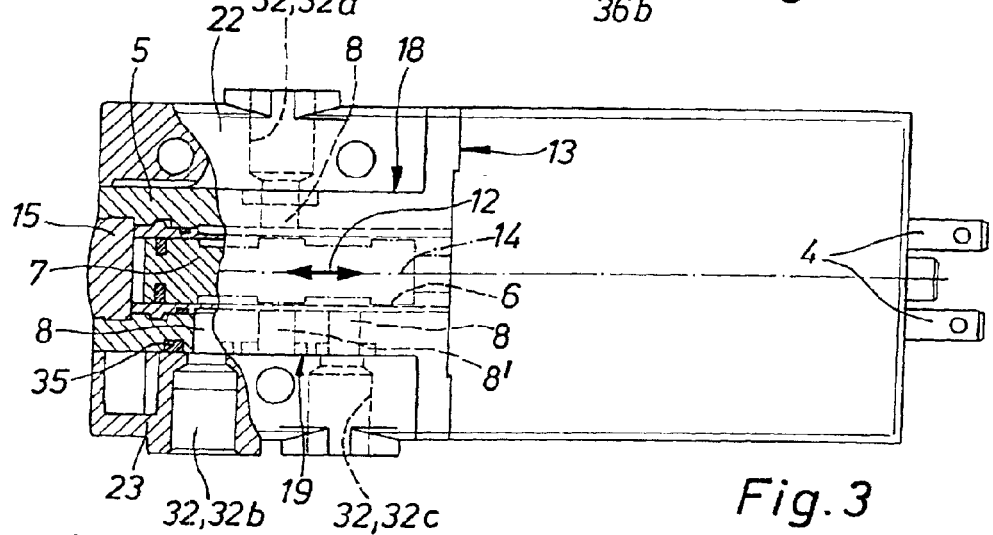
FIG. 3 is a partly cut away side elevation of the valve arrangement of FIG. 1 without showing the connection means provided on the connection boards.

The receiving space 6 has several ducts 8 opening into it peripherally, said ducts extending through housing 5. Dependent on the position of switching of the valve member 7 it is possible for the housing ducts 8 to be connected in different configurations for the flow of fluid between them. The actual switching position of the valve member 7 is set by the valve drive 2. The switching motion of the valve member 7 is preferably a linear movement and is indicated in FIG. 3 by a double arrow 12.

The valve drive 2 is releaseably attached on the front side of the valve arrangement 5 on a fitting face 13 or area. The switching movement 12 is at a right angle to the fitting area 13 and coincides in the present case with the alignment of the longitudinal axis 14 of the valve housing 5.

The valve member 7 is in the present case piston-like, although it can be in some other form.

On the rear side of the valve housing 5 opposite to the fitting area 13 the receiving space 6 for the valve member 7 is closed off by a terminal cover 15.

Figure 4:
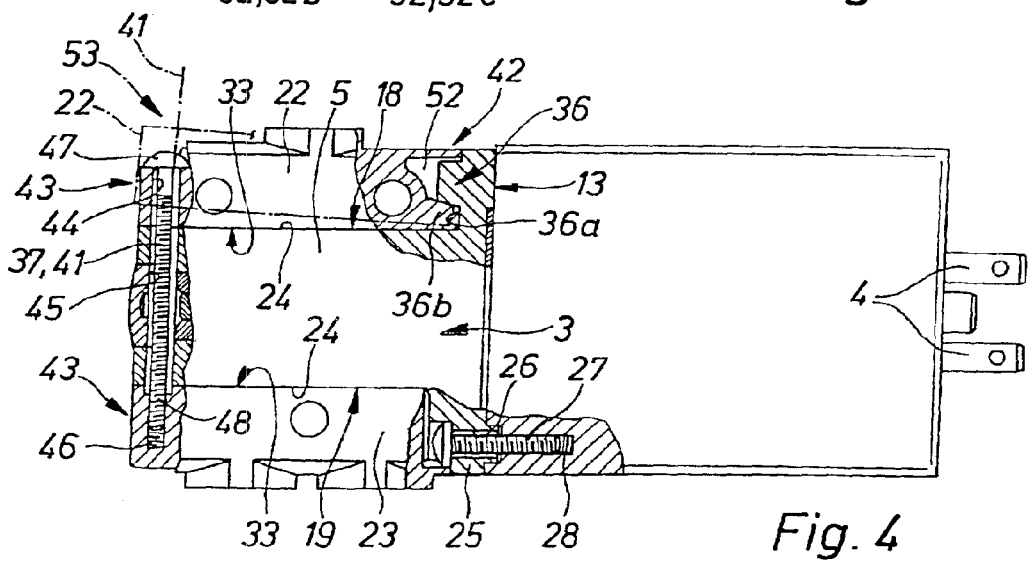
FIG. 4 is a further side elevation of the valve arrangement in accordance with FIG. 1, wherein a first cut away region is taken on the section line I—I as in FIG. 1 and in which two further cut away regions correspond to the section line II—II.

On a housing side 16 arranged in the longitudinal direction and on a second housing side 17 and arranged in the opposite direction thereto the valve housing 5 is provided with one respective interface, such interfaces being here termed first and second interfaces 18 and 19 for the sake of convenience. The first interface 18 serves for releaseably mounting a first connection board 22 and the second interface 19 serves for releaseably mounting a second connection board 23. FIGS. 3 and 4 show the mounted condition of these connection boards 22 and 23.

The first and the second interfaces 18 and 19 are preferably essentially constituted by flat housing faces of the valve housing 5, whose normal directions are parallel to each other and are perpendicular to the longitudinal axis 14 of the valve housing 5.

In the working embodiment each interface 18 and 19 is provided at the end or floor of a recess 24 in the valve housing 5, said recess being delimited by a lug-like attachment flange 25 extending at a right angle to the mounting area, at the front side, facing the mounting face 13. The mounting area 13 extends at the side, which is opposite to the recess 24, past the attachment flanges 25.

Each attachment flange 25 has an attachment hole 26 extending through it in parallelism to the longitudinal axis 14. An attachment screw 27 extends respectively through this hole 26 from the side facing the recess 24, such screw 27 having its head 31 bearing against the attachment flange 25 and having its threaded shank fitting into an attachment hole 28 in the valve drive 2. This means that valve housing 5 is detachably connected with the displacement drive 2. The attachment screws 27 may have self-tapping threads.

The two connection boards 22 and 23 are respectively provided with at least one connection duct 32, which at one end opens at a mounting face 33 on the respective connection board 22 and 23. The opposite terminal sections of the connection ducts 32 have connection means 34, which are located on the respective connection board 22 and 23 and permit respectively a fluid-tight and preferably detachable connection to a fluid duct (not illustrated in detail) leading to further equipment. This duct may be in the form of a rigid or flexible fluid lines.

In the mounted state the connection boards 22 and 23 are fitted in the respective recess 24 in the valve housing 5, their mounting face 33 facing the respective interface face 18 and 19 and each connection duct 32 being in communication with one of the housing ducts 8, which open at their ends opposite to the receiving space 6. Jointly with the mounted connection boards 22 and 23 the valve housing 5 constitutes a rectangular body which is more particularly tabular.

At the interfaces 18 and 19 suitable sealing means 35 are provided in the transitional area between the aligned connection ducts 8 and 32, such sealing means permitting transfer of fluid without leakage. The sealing means 35 may for instance be manufactured of a material with rubber-like properties as sealing rings.

In the working embodiment merely one connection duct 32 is provided on the first connection board 22. This connection duct 32 constitutes a power duct 32a, which is provided for connection with a load to be operated using fluid power. The second connection board 23 possesses in all two connection ducts 32, of which one constitutes a supply duct 32 and the other constitutes a venting duct 32c.

During operation of the valve unit 1 fluid pressure medium and more especially compressed air is supplied by way of the supply duct 32b. In one switching setting of the valve member 7 the supply duct 32b is connected with the power duct 32a, whereas at the same time the venting duct 32c is disconnected. In another switching setting of the valve member 7 the power duct 32a communicates with the venting duct 32c while the supply duct 32b is disconnected. It is in this manner that a 3+2 valve function is provided for. The valve 3 may however have a different type of functionality.

The connection boards 22 and 23 are preferably arranged in replaceable manner on the valve housing 5. This is something which favors a modular design of the valve unit 5, since a free choice is possible as regards the connection boards mounted which have different connection means 34. The connection means 34 present in the working embodiment are plug connecting means permitting a detachable and sealed plugged connection with fluid lines. There is here the possibility of providing further connection boards, which also have plug connection means and which however possess different connection diameters for the connection of fluid lines having a larger or smaller cross section. Moreover, as an alternative connection boards may be attached, which have different types of connection means, as for instance screw connection means, a variation of the types of screw threads being possible. Therefore as alternatives different connection boards may be mounted at one and the same interface 18 and 19.

The two connection boards 22 and 23 are provided with means which renders possible not only the use of less components but furthermore simple and quicker assembly and dismounting in the valve housing 5. Thus in the working example the two connection boards 22 and 23 share the common feature that they are respectively held by two different types of holding means on the valve housing 5. In this respect it is a question on the one hand of retaining means 36, which render possible a mutual interlocking anchoring function, while themselves not be able to hold the connection boards 22 and 23 in place. Therefore other attachment means 37 are provided, which permit a final firm locking in position of each respective connection board 22 and 23 on the valve housing 5, since the connection boards 22 and 23 with the valve housing 5 are clamped at a right angle to the plane of the interfaces 18 and 19 to the valve housing 5 and frictionally held. The attachment means 37 are in this case arranged at a distance from the retaining means 36.

A particular feature of the attachment means is that same are not only anchored on the valve housing 5 but that they also pass through such valve housing 5 internally and/or externally, that is to say they extend from the respective connection board, and bridge over the valve housing 5 to the other connection board, and engage both connection boards 22 and 23 and at the same time clamp the two connection boards 22 and 23 from opposite sides with the valve housing 5 between them. Therefore it is possible to speak of a sort of sandwich construction.

In the case of a particularly advantageous working example of the invention the attachment means 37 consist of a single attachment screw 41, which simultaneously serves for the attachment of the two connection boards 22 and 23 and extends through the valve housing 5.

The two connection boards 22 and 23 each respectively have an elongated configuration and extend along the length of the respectively associated recess 24. The retaining means 36 are here associated with the one terminal region, on the narrow side, of the connection boards 22 and 23, which in the following will be termed the front terminal region 42 and is adjacent to the associated attachment flange 25. The attachment screw 41 is on the opposite terminal region, on the narrow side, of the respective connection board 22 and 23, which will be referred to as the rear terminal region 43.

The first connection board 2 illustrated in the drawing on the top has a through hole 44 on the plate side and such however 44 is aligned with a through hole 45 in the valve housing 5, which for its part is axially aligned with an attachment hole 46 of lesser diameter. These above mentioned holes serve to receive the attachment screw 41, which is fitted and removed from the side adjacent to the first connection board 22, it having an attachment end 47 associated with the first connection board 22 and made in the form of a screw head 47.

The retaining means 36 are so designed that when the associated connection board 22 and 23 are fitted they act as hooks extending athwart the normal direction of the interfaces 18 and 19 similar to the showing of FIG. 4. During fitting the respective connection board 22 and 23, which is more particularly in a slightly oblique setting, is fitted in the recess 24 and is preferably at the same time moved toward the associated attachment flange 25 on whose side facing the recess the retaining means 36a, which are of the valve housing, are provided. The latter are in the working example constituted by two retaining wells.

In the course of such sideways movement the retaining means 36b, which is working embodiment are constituted by two spaced apart retaining projections, fit into the retaining wells. The depth of fitting is limited to the extent that the retaining wells 36a extend obliquely on the flank, which is opposite to and spaced from the respective interface 18 and 19, so that each retaining well 36a tapers with an increase in the distance from the recess 24. The retaining projections 36b on the respective connection board 22 and 23 taper accordingly so that the retaining means 36 may fit into each other as a sort of wedge joint, the depth of engagement being limited by the interlock between the retaining wells 36a and the retaining mean projections 36b.

It will be clear that the association of the retaining projections and the retaining wells may be reversed so that the projections and the retaining wells are changed over from the connection board and the valve housing.

After the connection board 22 and 23 have been placed on the associated interface 18 and 19 in a first assembly step so as to produce the retaining joint on the associated interface 18 and 19, finally the one attachment screw 41 is put in place. It is introduced from the outside of the first connection board 22 through the through hole 44 on the plate side and through the hole 45 on the housing side and screwed in so that its threaded shank 48, which is to the fore, is screwed into the attachment hole 46 in the second connection board 23. Since the connection boards 22 and 23 are preferably manufactured of plastic material, it is possible for the attachment hole 46 to be originally smooth-bored, the threaded shank having a self-taping thread, which on screwing in the attachment screw bites into the bore surface of the attachment hole 46. It would however be possible to have a conventional form of screw.

Since the driven end 47 of the attachment screw 41 bears against the first connection board 22 and the screw shank thereof 48 is screwed into the second connection board 43, it is possible for the two connection boards 22 and 23 to be clamped on the side opposite to the retaining means 36, firmly on the valve housing 5. The connection boards 22 and 23 are however attached in place in an interlocking manner even before tightening up the attachment screw 41, on the one hand owing to the mutual engagement of the retaining means 36 and on the other hand owing to the engagement of the attachment screw 41 fitting in the associated holes 44, 45 and 46.

Since the retaining means 36a and 36b on the connection board 22 and 23 and on the valve housing 5 are respectively arranged in pairs and in a plane parallel to the interfaces 18 and 19 at a right angle to the longitudinal axis 14 with a space between them, an intermediate space remains, in which the assembly screws 27 may be accommodated which serve for attachment of the valve drive 2.

Figure 2:
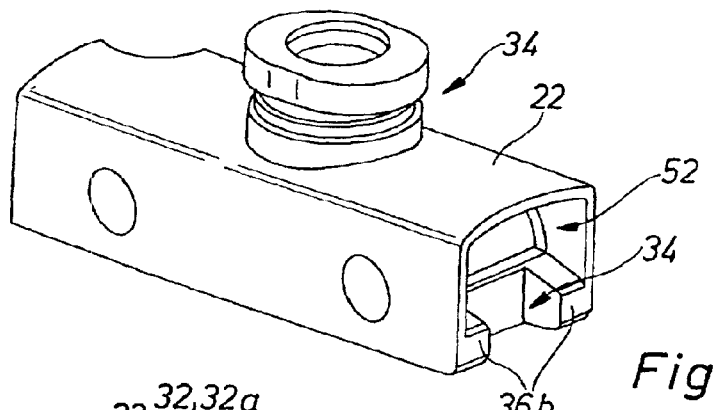
FIG. 2 shows the first connection board utilized in the valve arrangement of FIG. 1 in a perspective, separate view looking toward the retaining means.

The connection boards are preferably so designed at their front end region 42 that in the fitted state they conceal the respectively associated retaining means 36 from the outside. This is possible as indicated in FIGS. 2 and 4 by having a well 52 at the corresponding end face of the connection boards 22 and 23 so that those parts of the valve housing 5 may fit into the same, which are necessary for constituting the retaining means 36a on the valve housing. This means that the valve housing 5 and the connection boards 22 and 23 all in all constitute a tabular body free of gaps so that no dirt collects in it.

While in the working example both connection boards 22 and 23 of the valve unit 1 are designed in the form of single bodies so that the valve arrangement all in all has only one valve 3, a modified form of the invention provides for a multiple arrangement of valves 3, which are collected together as a battery or cluster. In such a case the second connection boards 23 of the respective valve units 1 are made integrally as a single elongated manifold plate 52 or joined together as such a plate 52 as indicated in chained lines in FIG. 2. Then there is practically a plurality of second connection boards 23 present, which are arranged in a row side to side, it being possible however for them to be constituted by single components of the said fluid manifold plate 52. There is then the possibility of mounting the individual valves using the first connection board 22 and the attachment means 37 individually on the fluid manifold plate 52 or board.

In order in such a case to remove the valve 3 from the fluid manifold plate 52, it is preferably not necessary to completely remove the first connection board 22. It is sufficient to slacken off the single attachment screw to such an extent that it is screwed out of the attachment hole 46 provided in the fluid manifold plate 52. Then the sealing means 45 provided on the first interface 18 and still elastically compressed, thrust the first connection board 22 away from the valve housing 5, the rear end region 43 of the first connection board 22 being tilted somewhat around the still engaged retaining means 36 upward until the attachment screw 41 assumes a skew setting within the through hole 44 on the plate side and the through hole 45 on the housing side.

This condition is indicated in FIG. 4 in chained lines at 53 to an exaggerated extent. The result is then that the valve housing 5, the first connection board 22 and the attachment screw 41 are tethered to each other and can not be completely detached from each other, this being something which facilitates shipping and handling to a considerable extent.

More particularly when the valve 3 is mounted on a fluid manifold plate 52 it may be advantageous to arrange all connection ducts 32 in the fluid manifold plate 52 or, respectively, in the second connection board 23 constituted by same. The valve 3 of the working example is readily suitable for such a modification, because its housing 5 opposite to the housing duct 8 leading to the first interface 18 has a further duct 8' and such duct 8' opens at the second interface 19 and within the receiving space 6 leads to the same region as the above mentioned housing duct 8. These two housing ducts are accordingly equivalent as regards their function and may be selectively employed for producing a connection with a connection duct 32, which is to be more especially employed as a power duct 32a.

In the case of application illustrated in drawings the second housing duct 8' at the second interface 19 is shut off by the second connection board 23 and intermediately placed sealing means in a fluid-tight fashion and is devoid of any function. However instead of the illustrated second connection board 23 it is possible to use a modified second connection board, as for instance in the form of a fluid manifold plate 52 or a separate plate part, having a further connection duct 32 (not illustrated) communicating with the further housing duct 8' and more particularly to be utilized as a power duct 32a. In such a case it is possible for the first connection board 22 to be replaced by a dummy plate free of any connection ducts, and serving to shut off the housing duct 8 leading to the first interface 18. The attachment of this dummy plate is performed in the same manner as the first connection board 22 replaced by it so that the above mentioned advantages occur in this case as well.

What is claimed is:

1. A valve comprising:
   a valve housing having a first interface, a second interface, and being formed with a plurality of housing ducts, said first interface being on a first side and said second interface being on a second side which is opposite said first side;
   a first connection board having a first connection duct communicating with one of said plurality of housing ducts, said first connection board being mounted to said first interface;
   a second connection board having a second connection duct communicating with one of said plurality of housing ducts, said second connection board being mounted to said second interface;
   a retaining means for anchoring said first connection board to said valve housing; and
   an attachment means for securing said first connection board to said valve housing, said attachment means being arranged at a distance from said retaining means and passing through said valve housing at said second connection board.

2. The valve as set forth in claim 1, further comprising a second retaining means for anchoring said second connection board to said valve housing; and
   wherein said attachment means is configured to secure said second connection board to said valve housing, said attachment means being arranged at said distance from said second retaining means.

3. The valve as set forth in claim 1, wherein said first connection board has an elongated configuration defining a front terminal region and a rear terminal region;
said retaining means being provided at said front terminal region; and
said attachment means are provided at said rear terminal region.

4. The valve as set forth in claim 1, wherein the attachment means comprise a screw.

5. The valve as set forth in claim 4, wherein said screw has a driven end associated with said first connection board.

6. The valve as set forth claim 4, wherein said second connection board is formed with an attachment hole; and
said screw is provided with a self-taping thread configured to cut a corresponding thread in said attachment hole.

7. The valve as set forth in claim 1, further comprising:
a first sealing ring located between said first connection board and said valve housing at said first connection duct; and
a second sealing ring located between said second connection board and said valve housing at said second connection duct.

8. The valve as set forth in claim 7, wherein said first sealing ring is formed from a rubber-elastic material;
said first sealing ring maintaining said first connection board in a slightly oblique position relative to said first interface prior to the installation of said second connection board so that when said attachment means is passed through both said first connection board and said valve housing said attachment means lies skew between said first connection board and said valve housing to hold said first connection board onto said valve housing.

9. The valve as set forth in claim 1, wherein said retaining means comprise:
a retaining well formed in said valve housing; and
at least one retaining projection formed on said first connection board configured to fit into said retaining well.

10. The valve as set forth in claim 9, wherein said retaining means includes two retaining projections spaced apart and arranged in a plane parallel to said first interface.

11. The valve as set forth in claim 1, wherein said first connection board is configured to conceal said retaining means.

12. The valve as set forth in claim 1, wherein said first connection duct is a power duct configured to be connected with a load to be operated.

13. The valve as set forth in claim 1, wherein said second connection board has a third connection duct communicating with one of said plurality of housing ducts;
said second connection duct being a supply duct; and
said third connection duct being a venting duct.

14. The valve as set forth in claim 13, wherein said second connection board has a fourth connection duct communicating with one of said plurality of housing ducts, said fourth connection duct is a power duct configured to be connected with a load to be operated.

15. The valve as set forth in claim 1, further comprising a connection means for connecting said first connection duct to a fluid line.

16. The valve as set forth in claim 15, further comprising a second connection means for connecting said second connection duct to a second fluid line, said connection means and said second connection means being different.

17. The valve as set forth in claim 1, wherein said first interface has a first flat face arranged in a first plane and said second interface has a second flat face arranged in a second plane which is parallel to said first plane.

18. The valve as set forth in claim 1, wherein said retaining means comprise:
a retaining well formed in said first connection board; and
at least one retaining projection formed on said valve housing configured to fit into said retaining well.

19. A valve configured to cooperate with a valve drive comprising:
a valve housing having a first interface, a second interface, an attachment flange, and being formed with a plurality of housing ducts, said first interface being on a first side and said second interface being on a second side which is opposite said first side, said attachment flange defining at least one recess between said first interface and said second interface and being configured to be attached to the valve drive;
a first connection board having a first connection duct communicating with one of said plurality of housing ducts, said first connection board being mounted to said first interface;
a second connection board having a second connection duct communicating with one of said plurality of housing ducts, said second connection board being mounted to said second interface;
a retaining means for anchoring said first connection board to said valve housing; and
an attachment means for securing said first connection board to said valve housing, said attachment means being arranged at a distance from said retaining means and passing through said valve housing at said second connection board.

20. The valve as set forth in claim 19, wherein a portion of said retaining means is associated with said valve housing, said portion being at said attachment flange.

21. The valve as set forth in claim 19, further comprising an assembly screw; and
wherein said attachment flange is formed with an attachment hole for insertion of said assembly screw to attach said attachment flange to the valve drive.

22. The valve as set forth in claim 19, wherein said attachment flange is configured to cooperate with one of an electromagnetic valve drive and a piezoelectric valve drive.

23. A valve comprising:
a valve housing having a first interface, a second interface, and being formed with a plurality of housing ducts, said first interface being on a first side and said second interface being on a second side which is opposite said first side;
a dummy plate mounted to said first interface for shutting off at least one of said plurality of housing ducts;
a connection board having a connection duct communicating with one of said plurality of housing ducts, said connection board being mounted to said second interface;
a retaining means for anchoring said dummy plate to said valve housing; and
an attachment means for securing said dummy plate to said valve housing, said attachment means being arranged at a distance from said retaining means and passing through said valve housing at said connection board.

* * * * *